(No Model.)
J. W. DEWEES.
TRIMMING ATTACHMENT FOR SEWING MACHINES.
No. 309,699. Patented Dec. 23, 1884.
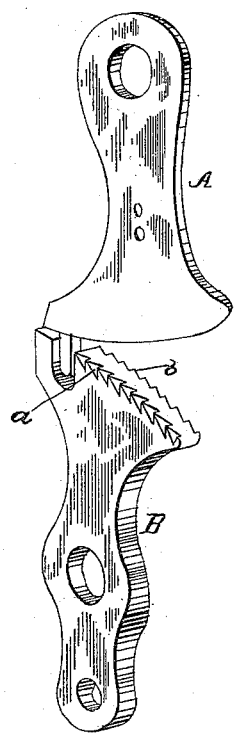
Witnesses
A. H. Connolly
W. E. Schiffer
Inventor
John W. Dewees
by Connolly Bros.
Attorneys

UNITED STATES PATENT OFFICE.

JOHN W. DEWEES, OF PHILADELPHIA, PENNSYLVANIA.

TRIMMING ATTACHMENT FOR SEWING-MACHINES.

SPECIFICATION forming part of Letters Patent No. 309,699, dated December 23, 1884.

Application filed March 19, 1884. (No model.)

*To all whom it may concern:*

Be it known that I, JOHN W. DEWEES, a citizen of the United States, residing at Philadelphia, in the county of Philadelphia and State of Pennsylvania, have invented certain new and useful Improvements in Trimming Attachments for Sewing-Machines; and I do hereby declare the following to be a full, clear, and exact description of the invention, reference being had to the accompanying drawing, which forms part of this specification.

This invention has relation to devices for trimming the edges of fabrics while being stitched upon a sewing-machine.

In Letters Patent No. 266,783, granted to me October 31, 1882, I have described and claimed a trimming device consisting of two levers having blunt jaws or edges which rock upon one another, the fabric to be trimmed passing between said jaws and being cut thereby. While such device is eminently fitted for the purpose, and operates perfectly with goods of limited thickness, I have found that where very heavy goods are to be trimmed the ordinary feeding devices of the sewing-machine to which they may be attached are insufficient to effect a proper feed, and the goods will gather in front of the cutter and cause the latter to cut in a curved line.

My invention has for its object the provision of means for effecting a regular feed of the material, whatever the thickness, and for feeding the goods in a straight line with the stitching to the trimming devices.

My invention consists, broadly, in providing the movable jaws or toggle-levers or other cutting or severing device of a trimming attachment with teeth, serrations or indentations, or the like, whereby the said jaws or jaw will operate to sever the material submitted to its action, maintaining the same in a straight line, and acting, either by itself or in conjunction with the ordinary feeding devices of a sewing-machine, to feed forward the material to be trimmed.

Referring to the accompanying drawing, A represents the upper jaw or toggle of my improved trimming device. B represents the lower jaw or toggle, upon which the upper jaw, A, works, and between which and the said upper jaw the fabric to be operated upon passes and is severed. As the mode of attachment and operation of the jaws or toggles is fully described in my Letters Patent before referred to, I deem it unnecessary to show more than the jaws or toggles, as my present invention is confined to the construction and operation of these alone. The upper edge of the jaw B is convex in the direction of its width, and upon the corners of the said upper edge I form indentations $a$, sloping toward the front of the jaws, thereby forming teeth $b$. The indentations are so formed that the teeth are sloping on one side and straight on the other, the sloping edge being toward the front of the jaw.

The operation is as follows: As the cloth is fed between the jaws or toggles, the teeth $b$ take hold of the cloth on the downward motion of the upper jaw, and feed it forward simultaneously with the severing action, and also serve to prevent the cloth or other fabric from turning under the jaw, thereby preserving and severing it in a straight line.

While I propose to use this device in connection with the usual feeding devices of a sewing-machine, yet it may, if desired, be used as a feeding and trimming device, as I have found that it will itself act as a feed for the machine.

The precise form of the indentations and the teeth that I have shown need not necessarily be the only form employed, as their shape and other characteristics may be varied without departing from my invention.

While I have described a single jaw with teeth upon its edges, it is obvious that where two opposing levers are employed, as in my before-mentioned Letters Patent, they may both be provided with teeth, if desired; and while I have described and shown two jaws rocking upon one another, it is obvious that two circular revolving and blunt-edged cutters having teeth upon one or both may be employed without departing from the spirit of my invention.

What I claim as my invention is as follows:

In a fabric-trimming device, the combination, with a movable severing device, blunt upon its periphery and provided with teeth upon its edges, of a similarly blunt-edged device adapted to work against the other, substantially as described.

In testimony that I claim the foregoing I have hereunto set my hand this 28th day of February, 1884.

JOHN W. DEWEES.

Witnesses:
  JOS. B. CONNALLY,
  WM. HALL WAXLER.